(12) United States Patent
Rudge

(10) Patent No.: US 7,347,311 B2
(45) Date of Patent: Mar. 25, 2008

(54) FOLDING MECHANISM FOR ROAD MACHINERY FOLDABLE CONVEYORS

(75) Inventor: Brian W. Rudge, Carlisle, PA (US)

(73) Assignee: Volvo Construction Equipment AB, Eskilstuna (SE)

( * ) Notice: Subject to any disclaimer, the term of this patent is extended or adjusted under 35 U.S.C. 154(b) by 54 days.

(21) Appl. No.: 11/448,941

(22) Filed: Jun. 7, 2006

(65) Prior Publication Data
US 2007/0284215 A1  Dec. 13, 2007

(51) Int. Cl.
*B65G 17/28* (2006.01)
(52) U.S. Cl. .................. 198/313; 198/581; 198/632
(58) Field of Classification Search ................ 198/300, 198/312, 313, 315, 318, 581, 861.3, 861.5, 198/632
See application file for complete search history.

(56) References Cited

U.S. PATENT DOCUMENTS

| | | | | |
|---|---|---|---|---|
| 2,812,867 A * | 11/1957 | Anderson | .................... | 198/581 |
| 3,085,675 A | 4/1963 | Feiteira, Jr. | | |
| 3,456,776 A * | 7/1969 | Viene | ......................... | 198/318 |
| 3,493,136 A | 2/1970 | Spellman, Jr. | | |
| 3,616,893 A | 11/1971 | Knadle et al. | | |
| 3,987,890 A | 10/1976 | Merritt | | |
| 4,923,359 A | 5/1990 | Petri et al. | | |
| 5,178,253 A | 1/1993 | Fix | | |
| 5,360,097 A | 11/1994 | Hibbs | | |
| 5,443,351 A | 8/1995 | Pettijohn | | |
| 5,662,210 A * | 9/1997 | Toews | ........................ | 198/632 |
| 5,819,950 A | 10/1998 | McCloskey | | |
| 6,296,109 B1 | 10/2001 | Nohl | | |
| 6,302,265 B1 * | 10/2001 | Cunningham | ............... | 198/632 |
| 6,543,622 B1 | 4/2003 | Fridman | | |
| 6,708,814 B2 * | 3/2004 | Wagstaffe | .................... | 198/581 |

\* cited by examiner

*Primary Examiner*—James R. Bidwell
(74) *Attorney, Agent, or Firm*—Michael Best & Friedrich LLP

(57) ABSTRACT

A mechanism is for a foldable vehicle conveyor having an axis, inner and outer sections and a joint connecting the sections, the outer section being pivotable between a deployed position and a folded position at which the outer section is disposed above the inner section. A linkage displaces the outer section between the two positions and includes a drive link pivotable on the inner section and a connector link pivotably connected with the drive link and with the outer section. The linkage moves between a deployed limit position where the drive link centerline extends parallel to the conveyor axis and the connector link centerline extends perpendicularly to the conveyor axis, and a folded limit position where the drive link centerline is generally perpendicular to the conveyor axis and the connector link centerline is generally parallel to and above the conveyor axis. An actuator displaces the linkage between the two positions.

36 Claims, 10 Drawing Sheets

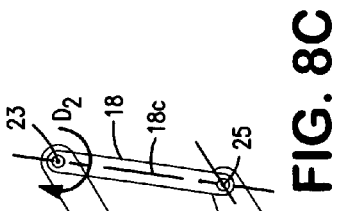
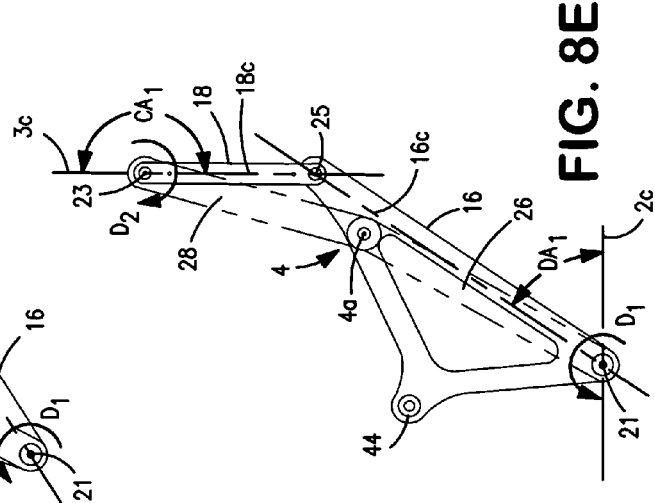
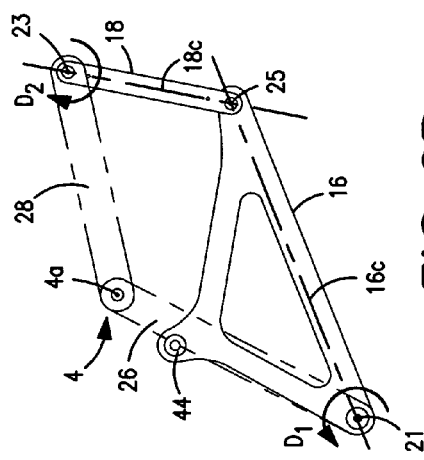
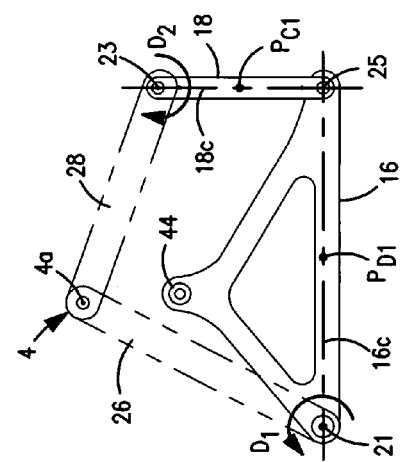
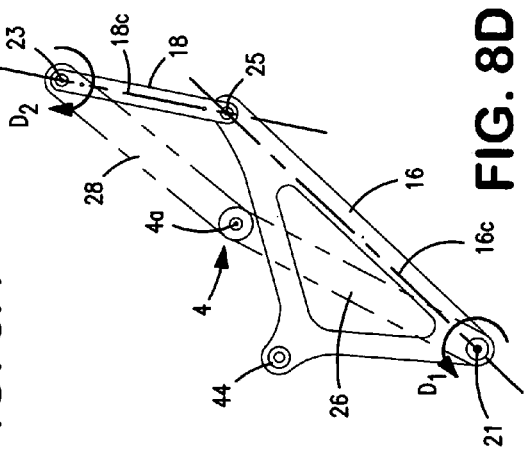

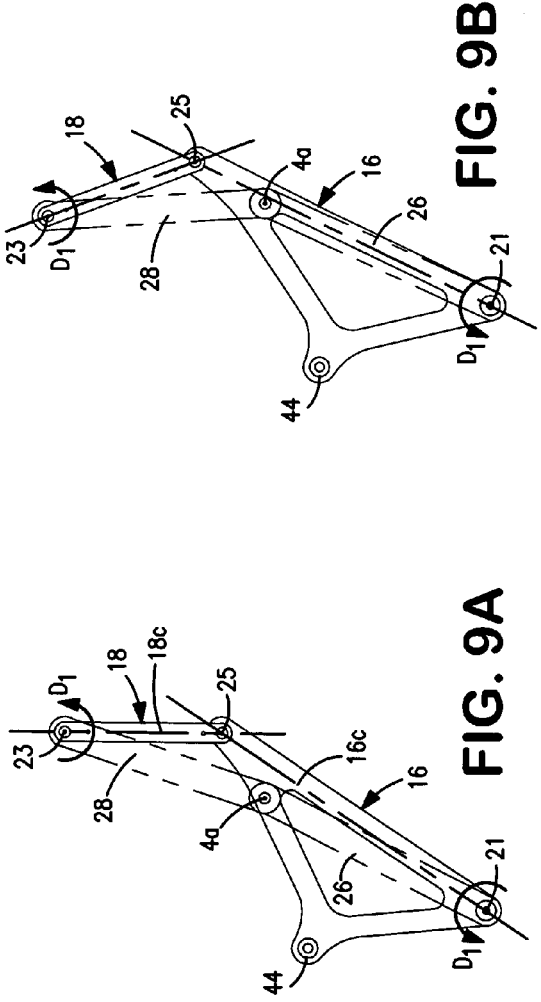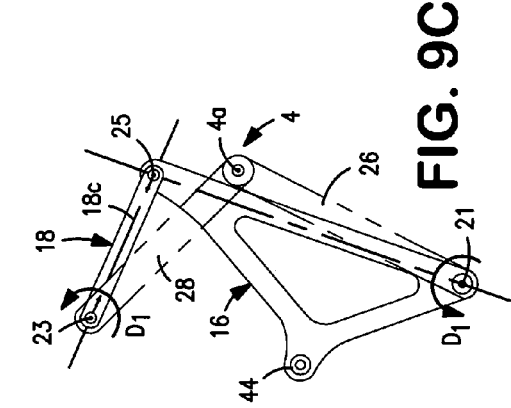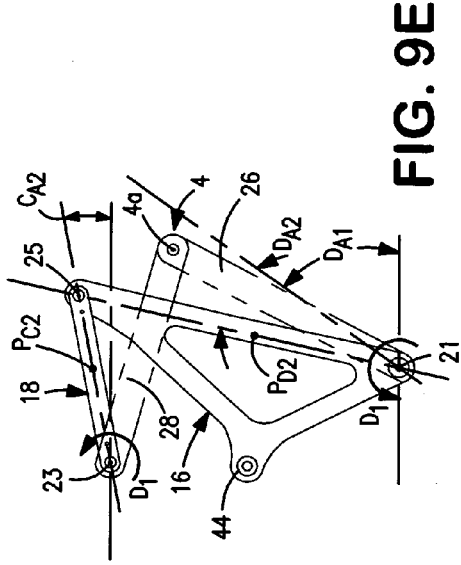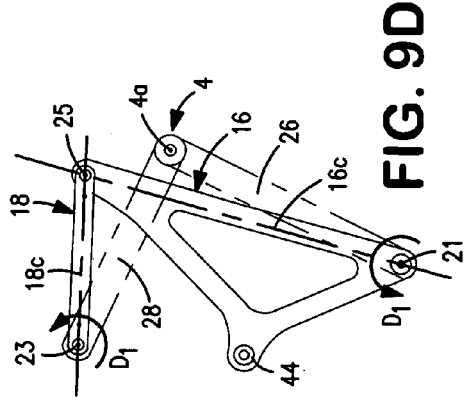

FOLDING MECHANISM FOR ROAD MACHINERY FOLDABLE CONVEYORS

The present invention relates to road construction vehicles, and more particularly to a foldable material transport conveyor for such vehicles.

One type of road construction vehicle, commonly referred to as a milling machine, generally includes a mainframe, a cutting drum rotatably mounted to the frame for removing such as asphalt from a roadbed, and a conveyor. The conveyor is used to transport the material cuttings to a truck bed or other collection apparatus. Generally, these conveyors are foldable to facilitate transport between job sites, usually by folding an outer conveyor section beneath an inner conveyor section that is attached to the main frame.

SUMMARY OF THE INVENTION

In one aspect, the present invention is a folding mechanism for a vehicle conveyor having a longitudinal axis generally along which the conveyor transports materials and including inner and outer sections and a joint pivotally connecting the inner and outer sections. Each one of the conveyor inner and outer sections has first and second ends and a centerline extending between the two ends. The inner section is connectable with a vehicle and the inner section centerline is generally collinear with the conveyor axis. The conveyor outer section is pivotable about the joint between a deployed position, at which the centerlines of the inner and outer conveyor sections are generally collinear and both centerlines extend generally along the conveyor axis, and a folded position at which the conveyor outer section is disposed generally above the conveyor inner section. The folding mechanism comprises a linkage configured to displace the conveyor outer section between the deployed and folded position. The linkage includes a drive link having a first end pivotably connected with the conveyor inner section, an opposing second end, and a centerline extending between the first and second ends. A connector link has a first end pivotably connected with the drive link, a second end pivotably connected with the conveyor outer section, and a centerline extending between the connector link first and second ends. The linkage is moveable between a first limit position at which the conveyor outer section is located in the deployed position, the drive link centerline extends generally parallel to the conveyor axis and the connector link centerline extends generally perpendicular to the conveyor axis, and a second limit position. At the second limit position, the conveyor outer section is located in the folded position, the drive link centerline extends generally perpendicular to the conveyor axis, and the connector link centerline extends generally parallel to and is spaced above the conveyor axis.

In another aspect, the present invention is again a folding mechanism for a conveyor as described above. The folding mechanism comprises a linkage configured to displace the conveyor outer section between the deployed and folded positions. The linkage includes a drive link having a first end pivotably connected with the conveyor inner section and an opposing second end, and a connector link having a first end pivotably connected with the drive link and a second end pivotably connected with the conveyor outer section. The linkage is moveable between a first limit position, at which the conveyor outer section is located in the deployed position, and a second limit position at which the conveyor outer section is located in the folded position. Further, an actuator is mounted on the conveyor inner section, configured to displace the linkage between the first and second limit positions, and has a movable member connected with the drive link. The actuator movable member is displaceable between a first position, at which the linkage is located at the first limit position, and a second position at which the linkage is located at the second limit position. At least one of the actuator and the linkage is configured such that the folding mechanism exerts on the conveyor outer section a first moment about the joint axis when the actuator member displaces from the actuator first position toward the member second position. Alternatively, the folding mechanism exerts on the conveyor outer section a second moment about the joint axis when the actuator member displaces from the actuator second position toward the first position. The magnitude of the first moment is generally equal to the magnitude of the second moment.

In a further aspect, the present invention is again a folding mechanism for a vehicle conveyor, the conveyor being as generally described above and further having inner and outer conveyor sections with upper and lower surfaces extending generally between the two ends thereof. The folding mechanism comprises a linkage configured to displace the conveyor outer section between the deployed and folded positions. The linkage includes a drive link having a first end pivotally connected with the conveyor inner section, an opposing second end, and a centerline extending between the first and second ends. A connector link has a first end pivotally connected with the drive link, a second end pivotally connected with the conveyor outer section, and a centerline extending between the connector link first and second ends. The linkage is moveable between a first limit position, at which the conveyor outer section is located in the deployed position, and a second limit position at which the conveyor outer section is located in the folded position. Further, an actuator is mounted on the conveyor inner section, is operatively connected with the drive link, and is configured to angularly displace the drive link about an axis extending through the drive link first end so as to move the linkage between the first and second limit positions. The actuator and folding linkage are arranged on the inner and outer conveyor sections such that each one of the actuator, the drive link and the connector link remains spaced generally above the lower surface of the conveyor inner section when the linkage moves between the first and second limit positions.

In yet another aspect, the present invention is again a folding mechanism for a conveyor as described above. The folding mechanism comprises a linkage configured to displace the conveyor outer section between the deployed and folded positions. The linkage includes a drive link having a first end pivotally connected with the conveyor inner section, an opposing second end, and a centerline extending between the first and second ends and a connector link having a first end connected with the drive link, a second end connected with the conveyor outer section, and a centerline extending between the first and second ends. The linkage is moveable between a first limit position, at which the conveyor outer section is located in the deployed position, and a second limit position at which the conveyor outer section is located in the folded position. An actuator is coupled with the conveyor inner section and has a moveable member linearly displaceable along an axis, the actuator axis extending generally parallel to the conveyor inner section centerline. The actuator moveable member is coupled with the drive link such that displacement of the member along the axis moves the linkage between the first limit position, at which the drive link centerline extends generally parallel to and spaced below the actuator axis and the connector link centerline extends generally perpendicular to the actuator axis, and the second limit position. At the second limit position, the drive link centerline extends generally perpendicular to the actuator axis and the connector link centerline extends generally parallel to and spaced above the actuator axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 3, are each an enlarged, broken-away view of the conveyor and folding mechanism, showing an actuator and a single folding mechanism with the conveyor outer section in the deployed position, an intermediate position, and the folded position, respectively;

FIG. 4, are each a broken-away, side elevational view of the conveyor and folding mechanism, each showing a different position of a conveyor outer section as the conveyor section is displaced between the deployed and folded position;

FIGS. 8A-8E, collectively FIG. 8, are each a broken-away, side elevational view of a single folding linkage, each showing a different position of the linkage as the linkage moves between first limit position and an intermediate position; and FIGS. 9A-9E, collectively FIG. 9, are each a broken-away, side elevational view of a single folding linkage, each showing a different position of the linkage as the linkage moves between the intermediate position and a second limit positions.

DETAILED DESCRIPTION OF THE INVENTION

Figure 1:
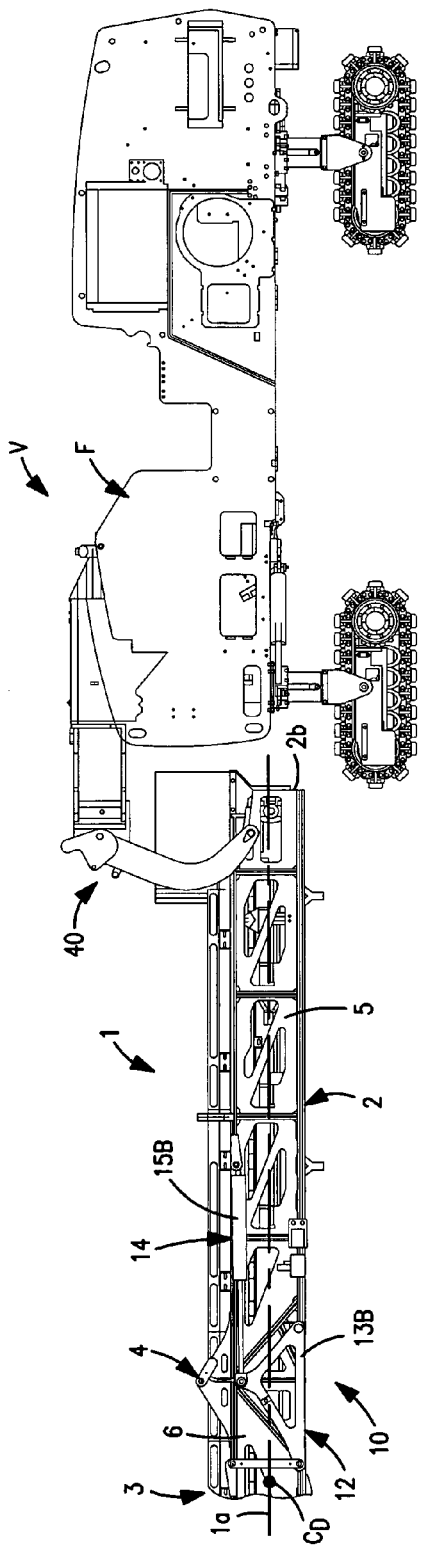
FIG. 1 is a partly broken-away, side elevational view of a conveyor having a folding mechanism in accordance with the present invention, shown mounted to a road milling machine and in a deployed position.

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import. Furthermore, the term "position" is used herein to indicate a position, location, configuration, orientation, etc., of one or more components of a conveyor or/and a folding mechanism and each is depicted in the drawings with reference to a randomly selected point on the item being described. Such points in the drawing figures are randomly selected for convenience only and have no particular relevance to the present invention.

Referring now to the drawings in detail, wherein like numbers are used to indicate like elements throughout, there is shown in FIGS. 1-9 a folding mechanism 10 for a vehicle conveyor 1, the conveyor 1 having a longitudinal axis 1$a$ generally along which the conveyor 1 transports materials (e.g., roadway cuttings, etc.) and including inner and outer sections 2, 3 and a joint 4 pivotally connecting the inner and outer sections 2, 3. Each one of the conveyor inner and outer sections 2, 3 has first and second ends 2$a$, 2$b$ and 3$a$, 3$b$, respectively, and a centerline 2$c$, 3$c$ extending between the two ends 2$a$, 2$b$ and 3$a$, 3$b$. The conveyor inner section 2 is connectable with a vehicle V (FIGS. 1 and 2) and the inner section centerline 2$c$ is (and always remains) generally collinear with the conveyor axis 1$a$. The conveyor outer section 3 is pivotable about the joint 4 between a deployed position $C_D$ (FIGS. 1, 3A, 4A, 6 and 7A) at which the centerlines 2$c$, 3$c$ of the inner and outer conveyor sections 2, 3 are generally collinear and both centerlines 2$c$, 3$c$ extend generally along the conveyor axis 1$a$, and a folded position $C_F$ (FIGS. 2, 3C, 4I and 7B) at which the conveyor outer section 3 is disposed generally above the conveyor inner section 2. Basically, the folding mechanism 10 comprises at least one and preferably two linkages 12 each configured to displace the conveyor outer section 3 between the deployed and folded positions $C_D$, $C_F$, and at least one and preferably two actuator(s) 14 mounted to the conveyor inner section 2 and configured to displace the linkage(s) 12 between first and second limit positions $L_1$, $L_2$, as described below.

Each linkage 12 includes a drive link 16 connected with the conveyor inner section 2 and a connector link 18 connected with the conveyor outer section 3. The drive link 16 has a first end 16$a$ pivotably connected with the conveyor inner section 3, an opposing second end 16$b$, and a centerline 16$c$ extending between the first and second ends 16$a$, 16$b$. The drive link 16 is connected with the conveyor inner section 2 at a conveyor attachment point 20, such that the link 16 is angularly displaceable about a drive link axis 21 extending through the link first end 16$a$ and the attachment point 20 on the conveyor section 2. Further, the connector link 18 has a first end 18$a$ pivotably connected with the drive link 16, a second end 18$b$ pivotably connected with the conveyor outer section 3, and a centerline 18$c$ extending between the connector link first and second ends 18$a$, 18$b$. The connector link 18 is connected with the conveyor outer section 3 at a conveyor attachment point 22, such that the link 18 is angularly displaceable about a connector link axis 23 extending through the link second end 18$b$ and the attachment point 22 on the conveyor section 3. Furthermore, the two links 16, 18 are connected together by a link joint 24 so as to be relatively angularly displaceable about an axis 25 extending through the drive link second end 16b, the joint 24, and the connector link first end 18a.

As mentioned above, the linkage(s) 12 are each moveable between first and second limit positions $L_1$, $L_2$ in order to move or pivotally displace the conveyor outer section 3 about the joint 4 between the deployed and folded positions $C_D$, $C_F$. Specifically, when the linkage 12 is disposed or arranged at the first limit position $L_1$, the conveyor outer section 3 is located in the deployed position $C_D$, and each link 16, 18 is arranged as follows. The drive link 16 is located at a drive link first limit position $p_{d1}$, at which link centerline 16c extends generally parallel to the conveyor axis 1a (and thus also to the inner section centerline 2c), and the connector link 18 is located at a connector link first limit position $p_{C1}$, at which the link centerline 18c extends generally perpendicular to both the conveyor axis 1a and the outer section centerline 3a (see FIGS. 3A, 4A and 7A). Preferably, at the link first limit positions $p_{D1}$, $p_{C1}$, the drive link centerline 16c extends substantially parallel to, and is spaced below, the conveyor transport axis 1a (i.e., about 0° between line 16c and axis 1a) and the connector link centerline 18c extends substantially perpendicular to the conveyor axis 1a (i.e., an angle $A_C$ between the axis 1a and centerline 18c is about 90°).

Alternatively, when the linkage 12 is disposed/arranged at the second limit position $L_2$, the conveyor outer section 3 is located in the folded position $C_F$ and the two links 16, 18 are arranged as follows. The drive link 18 is located at a drive link second limit position $p_{D2}$, at which the link centerline 16c extends generally perpendicular to the conveyor axis 1a (and thus also to inner conveyor section centerline 2a), and the connector link 18 is located at a connector link second limit position $p_{C2}$, at which the link centerline 18c extends generally parallel to and is spaced above the conveyor axis 1a, and is preferably generally parallel to, but spaced below, the conveyor outer section centerline 3a (see FIGS. 3C, 4I and 7B). Most preferably, when located at the second limit positions $p_{D1}$, $p_{C1}$, the drive and connector links 16, 18 are arranged such that an angle $A_D$ between the drive link centerline 16c and the conveyor axis 1a (or the inner section centerline 3a) is about 75° and an angle $A_C$ between the connector link centerline 18c and conveyor axis 1a (or the outer section centerline 3a) is less than about 10°. As discussed in detail below, the above-described specific orientations of the links 16, 18 at the two linkage limit positions $L_1$, $L_2$, and their arrangements with respect to the actuator 14, provide certain advantages for the operation of the folding mechanism 10.

As best shown in FIGS. 4A-4I, the conveyor 1 is preferably constructed such that the conveyor outer section 3 moves through a total angular displacement $A_C$ about the joint axis 4a of about one hundred eighty degrees (180°) when displacing between the deployed and folded positions $C_D$, $C_F$. During such total or net conveyor displacement, the conveyor outer section 3 moves through a plurality of different angular positions about the joint axis 4a between the two limit or "end" positions $C_D$, $C_F$, while the linkage 12 simultaneously moves through a series of different arrangements or positions. That is, the linkage 12 is continuously adjusted or "rearranged" between the two linkage limit positions $L_1$, $L_2$ as the drive link 16 pivotally displaces with respect the inner conveyor section 2 and the connector link 18 simultaneously pivots and linearly displaces between the two link limit positions $p_{C1}$, $p_{C2}$. More specifically, during folding or unfolding of the conveyor 1, the drive link 16 merely pivots or angularly displaces between the two link positions $p_{D1}$, $p_{D2}$ since the link 16 is pivotally attached to the conveyor inner section 2, which is generally immovable during displacement of the outer section 3. However, since the connector link 18 is attached both to the pivoting conveyor outer section 3 and the pivoting drive link 16, the link 18 simultaneously pivots with respect to the drive link 16 about axis 25 through the link joint 24, pivots with respect to the outer conveyor section 3 about axis 23 through the conveyor attachment point 22, and linearly displaces between the connector link first and second limit positions $p_{C1}$, $p_{C2}$.

Further, when displacing in either angular direction $D_1$, $D_2$ between the two end positions $C_D$, $C_F$, the conveyor outer section 3 moves through or is temporarily disposeable at a central intermediate position $C_I$ located between the deployed and folded positions $C_D$, $C_F$, at which the outer section centerline 3c extends generally perpendicular to the inner section centerline 2a. Specifically, when initially located at the deployed position $C_D$, the conveyor outer section 3 first moves generally upwardly until reaching the intermediate position $C_I$, and thereafter moves generally downwardly toward the folded position $C_D$, and vice-versa. In order to move the conveyor outer section 3 through the intermediate position $C_I$ as described, the linkage 12 is configured to move as follows. First, when the linkage 12 displaces the conveyor outer section 3 from the deployed position $C_D$ to the intermediate position $C_I$, the drive link 16 displaces in the first angular direction $D_1$ about the drive link axis 21 through a drive link first angle $DA_1$ and the connector link 18 pivots in the opposing direction $D_2$ about the connector link axis 23 through a connector link first angle $CA_1$ with respect to the conveyor 3a, as indicated in FIG. 8E. In other words, the two links 16, 18 pivot with respect to the attached conveyor section 2, 3, respectively, in opposing angular directions $D_1$, $D_2$, respectively, and thus move away from each other about the joint axis 25. Preferably, the drive link first angle $DA_1$ has a value of about fifty-five degrees (55°) and the connector link first angle $CA_1$ has a value of about ninety degrees (90°).

Furthermore, when the linkage 12 displaces the conveyor outer section 3 from the intermediate position $C_I$ to/toward the folded position $C_F$, the drive link 16 continues to displace in the first direction $D_1$ about the drive link axis 21 and moves through a drive link second angle $DA_2$. However, the connector link 18 reverses direction so as to displace in the first direction $D_1$ about the connector link axis 23, and moves through a connector link second angle $CA_2$. As such, the two links 16, 18 pivot with respect to the attached conveyor section 2, 3, respectively, in a common angular direction $D_1$ and thus move generally toward each other about the joint axis 25. Preferably, the drive link second angle $DA_2$ has a value of about twenty degrees (22°) and the connector link second angle $CA_2$ has a value of about nine degrees (9°). Thus, the angular displacement of the two links 16, 18 is substantially greater when moving between the deployed and intermediate positions $C_D$, $C_I$ as compared with the corresponding link displacements when moving between the intermediate and folded positions $C_I$, $C_F$. More specifically, the drive link first angle $DA_1$ is preferably at least two times greater than the drive link second angle $DA_2$, and the connector link first angle $CA_1$ is preferably at least nine times greater than the connector link second angle $CA_2$.

Furthermore, the linkage 12 moves in a generally opposite manner when the conveyor outer section 3 displaces in the second direction $D_2$ about the joint axis 4a from the folded position $C_F$ to the deployed position $C_D$. That is, the drive and connector links 16, 18 generally move away from each other about the joint axis 4a when displacing the conveyor outer section 3 from the folded position $C_F$ to the intermediate position $C_I$, and then move generally toward each other as the outer section 3 moves between the intermediate position $C_I$ toward the deployed position $C_D$. Additionally, the angular displacement of each link 16, 18 is substantially lesser when moving between the folded and intermediate positions $C_F$, $C_I$ as compared with the displacement between the intermediate and deployed positions $C_I$, $C_D$.

Referring particularly to FIGS. 8 and 9, the linkage(s) 12 are each preferably a four bar mechanism that further includes a base link 26 provided by at least a portion (generally indicated by phantom lines) of the inner conveyor section 2 and an output link 28 provided by at least a portion (indicated by phantom lines) of the output conveyor section 3. Specifically, the base link 26 is provided by a portion of the conveyor outer section extending between the drive link attachment point 20 and the joint 4 and the follower link 28 includes the portion of the outer conveyor section 3 extending between the connector link attachment point 22 and the joint 4. Further, the base link 26 is generally relatively immovable, i.e., does not displace during movement of the other three links 16, 18, 28, while the output link 28 moves about one-hundred eighty degrees (180°) during displacement of the outer conveyor section 3. Most preferably, the linkage four bar mechanism is of the non-Grashoff variety such that none of the links 16, 18, 26, or 28 is capable of angularly displacing through three hundred degrees (360°), i.e., no link is capable making of a complete revolution about any link axis 21, 23, 21, 23, or 25.

Figure 3A:
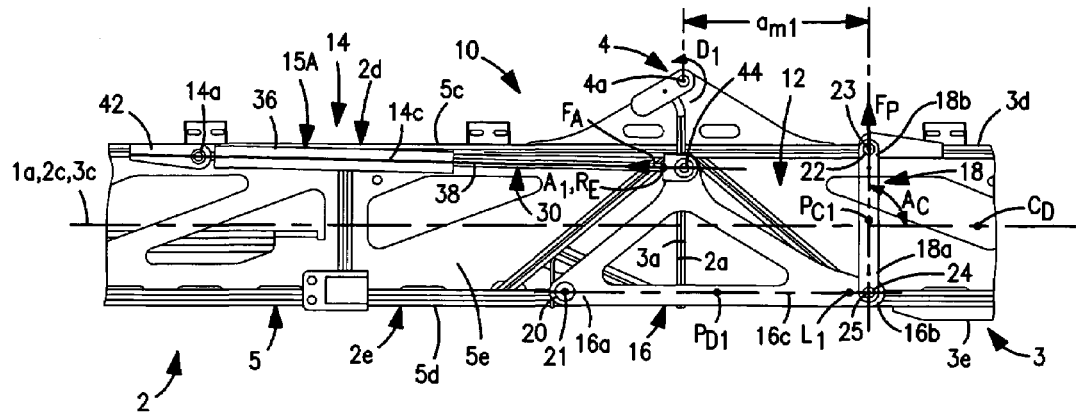
FIGS. 3A-3C, collectively
Figure 3B:
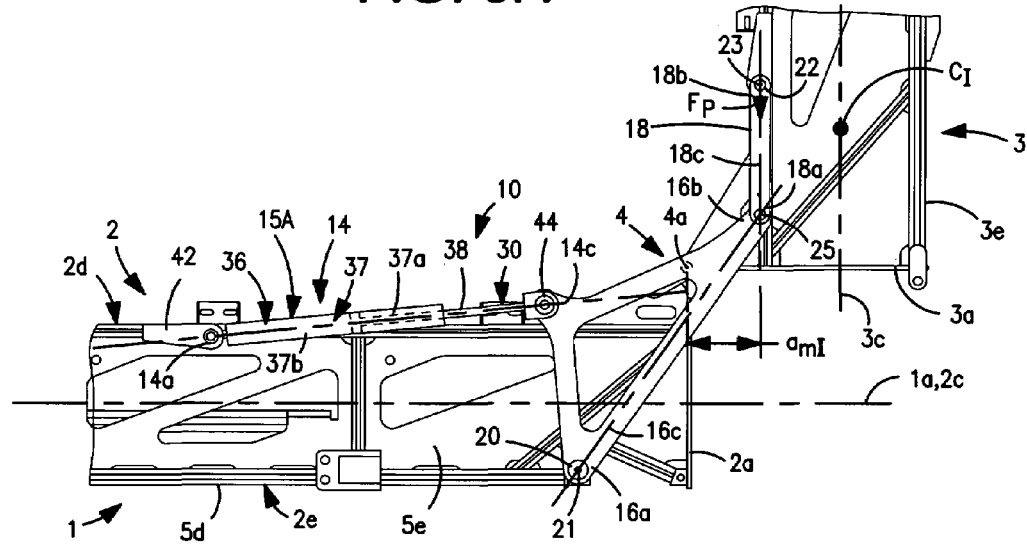
Figure 3C:
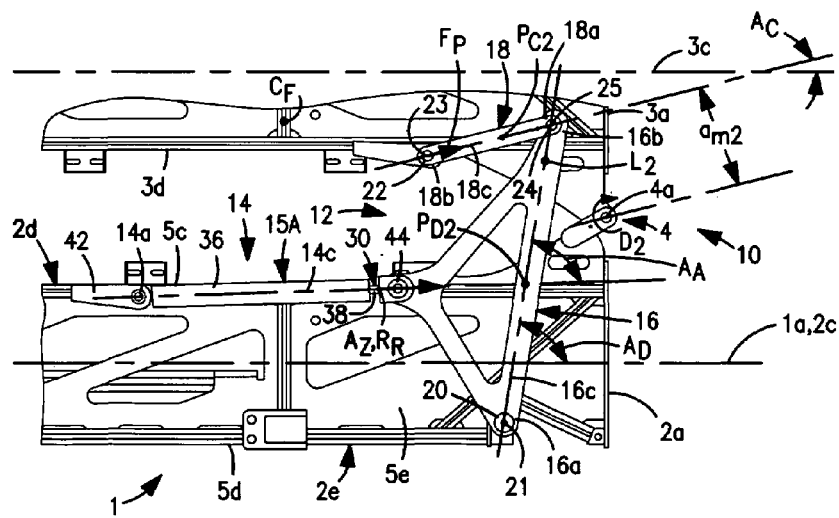
Figure 4A:
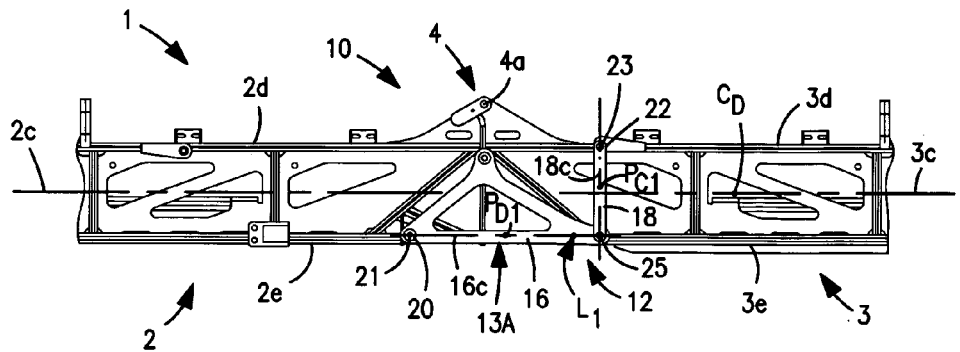
FIGS. 4A-4I, collectively
Figure 4B:
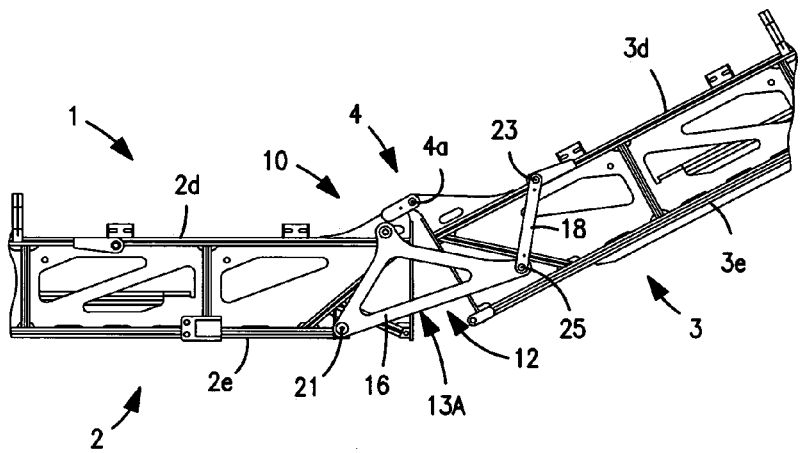
Figure 4C:
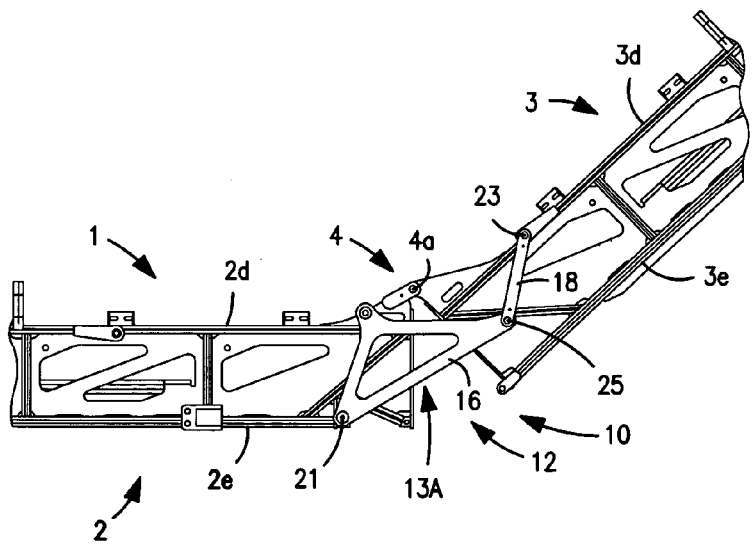
Figure 4D:
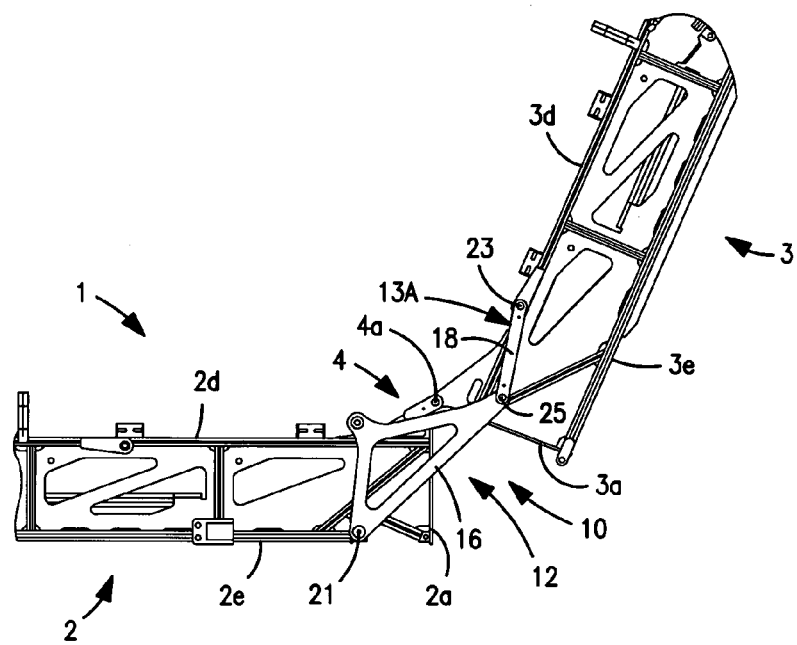
Figure 4E:
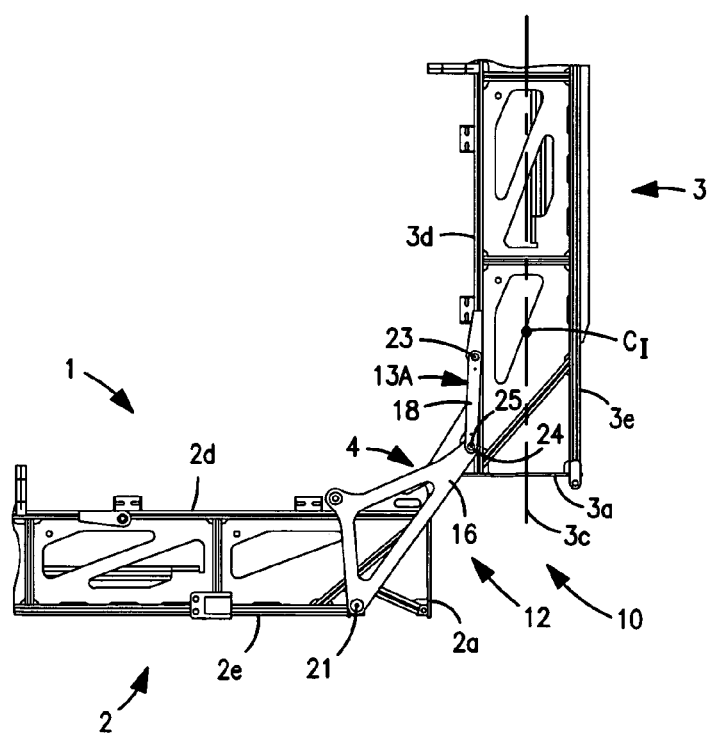
Figure 4F:
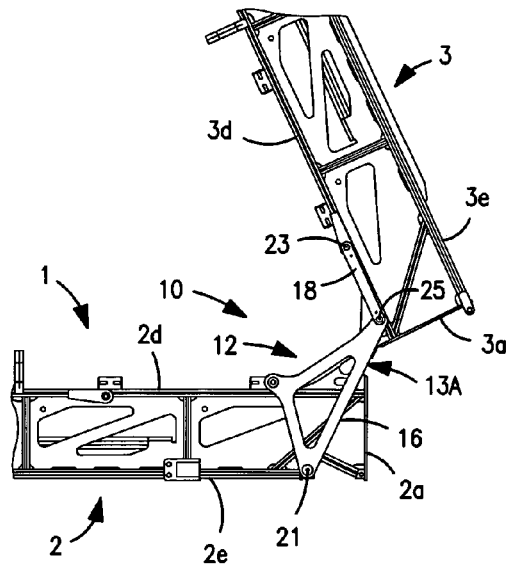
Figure 4G:
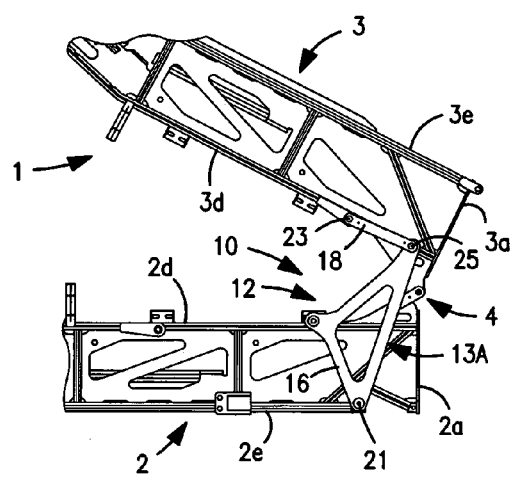
Figure 4H:
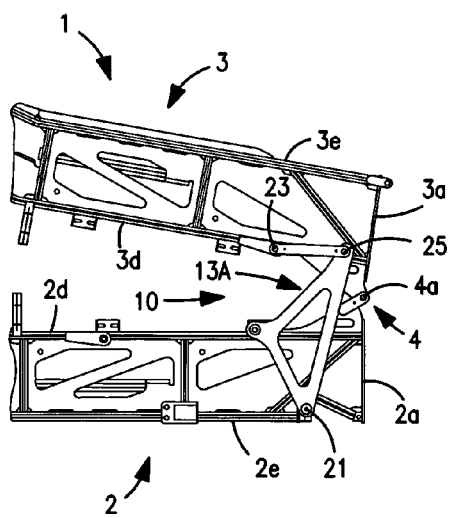
Figure 4I:
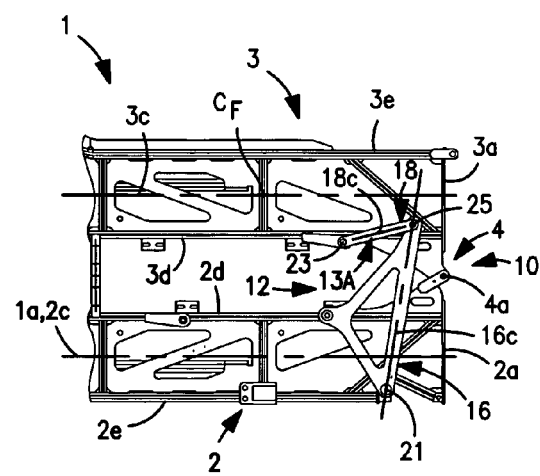
Figure 6:
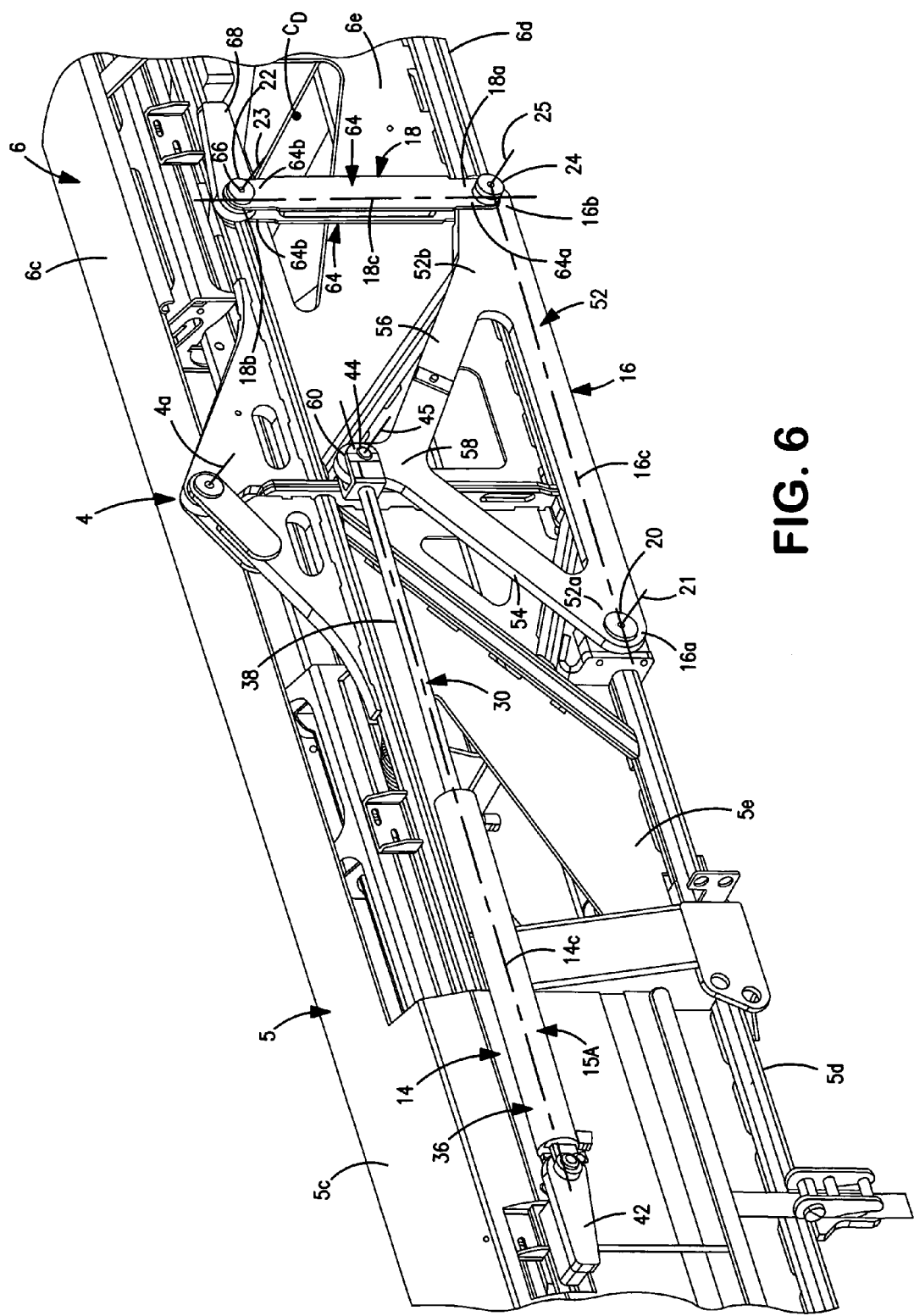
FIG. 6 is a greatly enlarged, broken-away perspective view of the folding mechanism, showing a single folding linkage with the conveyor outer section in the deployed position, FIGS. 7A-7B, collectively

Referring now to FIGS. 3, 6 and 7, the actuator(s) 14 each preferably has a central axis 14c and a moveable drive member 30 linearly displaceable generally along the axis 14c, the axis 14c preferably extending generally parallel with the conveyor axis 1a. The actuator drive member 30 is connected with the associated drive link 16 such that displacement of the drive member 30 along the axis 14c moves the linkage 12 between the first and second limit positions $L_1$, $L_2$, thereby moving the conveyor outer section 3 between the deployed and folded positions $C_D$, $C_F$. More specifically, the actuator drive member 30 is displaceable along the actuator axis 14c between a first position $A_1$, at which the linkage 12 is disposed at the first limit position $L_1$, and a second position $A_2$ at which the linkage 12 is disposed at the second limit position $L_2$. Further, the actuator 14 is configured such that the actuator axis 14c remains generally parallel with the conveyor axis 1a when the drive member 30 displaces between the first and second positions $A_1$, $A_2$. In other words, the remaining portion of the actuator 12 (e.g., the cylinder 36, etc., as described below) remains generally fixed, and thus does not substantially pivot or otherwise move, as the moveable drive member 30 (e.g., a piston rod 38) moves with the linkage 12 and the conveyor outer section 3. Most preferably, each actuator 14 is capable of pivoting about an end axis 14c through a relatively small maximum angular displacement (e.g., about 6°-7°) when moving between the first and second positions $A_1$, $A_2$, as best shown in FIG. 3B, but does act upon the linkage 12 along the axis 14c or "line of action" that extends generally parallel with respect to the conveyor centerline 1a.

Figure 7A:
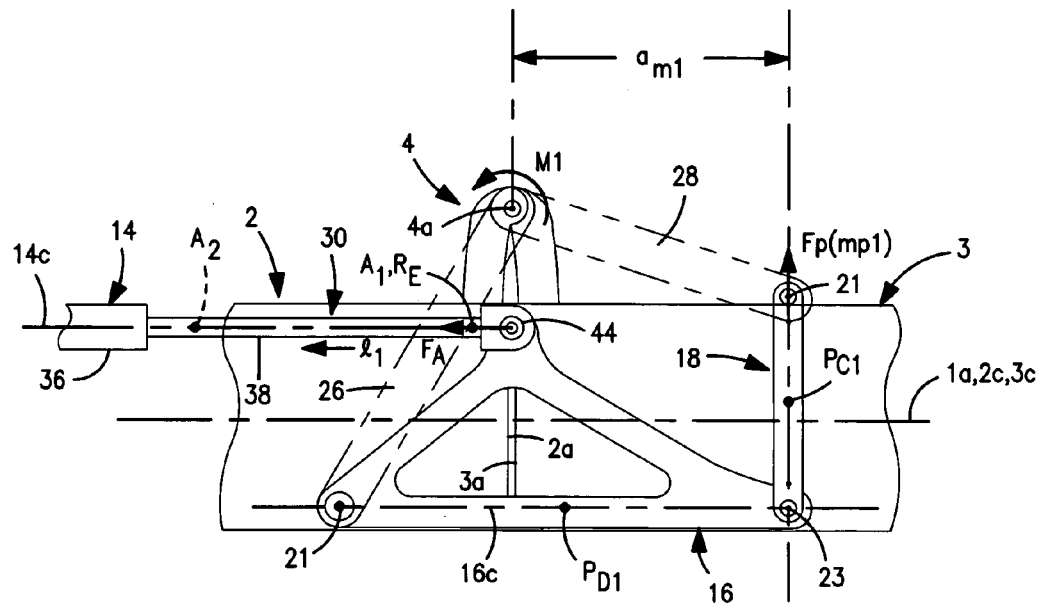
FIG. 7, is a more diagrammatic, enlarged side elevational view of the conveyor and a single folding linkage, shown with the conveyor outer section in the deployed and folded positions.
Figure 7B:
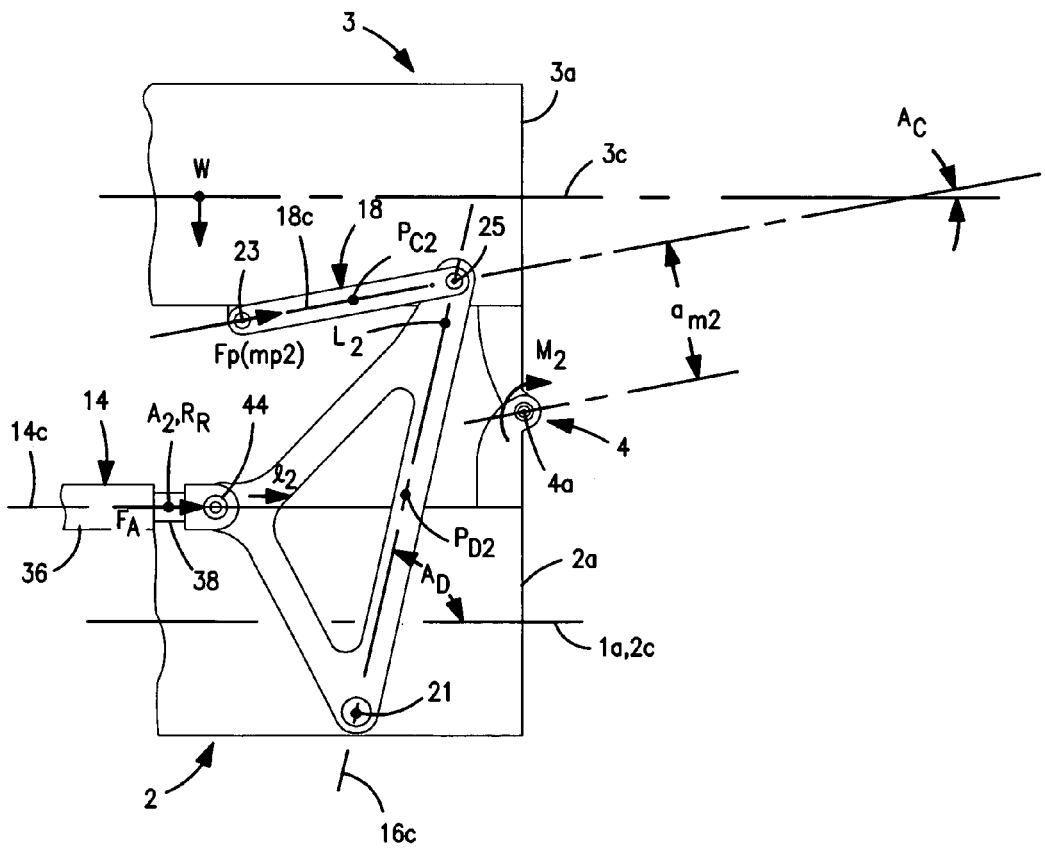

Referring specifically to FIGS. 7A and 7B, at least one of the actuator 14 and the linkage(s) 12, and preferably both, is/are configured (e.g., sized, positioned, oriented, etc.) such that the folding mechanism 10 exerts on the conveyor outer section 3 a first moment M1 about the joint axis 4a at the deployed position $C_D$ and a second, generally equal moment M2 about the axis 4a on the conveyor outer section 3 at the folded position $C_F$. Specifically, the folding mechanism 10 exerts on the conveyor outer section 3 the first moment M2 about the joint axis 4a when the actuator member 30 displaces from the actuator first position $A_1$ in a direction $l_1$ toward the member second position $A_2$. Alternatively, the mechanism 10 exerts on the conveyor outer section 3 the second moment M2 about the joint axis 4a when the actuator member 30 displaces from the actuator second position $A_2$ in direction $l_2$ toward the first position $A_1$, with the magnitude of the first moment M1 being generally equal to a magnitude of the second moment M2. as such, the initial angular acceleration on the conveyor outer section 3, when it moves from rest at the deployed position $C_D$ in a first direction D1 (FIG. 4A) toward the folded position $C_F$, is generally equal to the angular acceleration in a second, opposing angular direction D2 (FIG. 4C) when the conveyor section 3 moves from rest at the folded position $C_F$ toward the deployed position $C_D$.

Further, the linkage(s) 12 and/or the actuator(s) 14 is/are configured such that the magnitude of the moment at all intermediate positions between the deployed and folded positions $C_D$, $C_F$ (e.g., as shown in FIGS. 8B-8E and 9A-9D) is preferably generally lesser than the first and second moments M1, M2. As such, the maximum moment applied to (and thus the angular acceleration of) the conveyor outer section 3 occurs at the two linkage limit positions $C_D$, $C_F$, and thus at the two positions from which the conveyor section 3 is moved from an angularly stationary or "rest" position, and at each position $C_D$, $C_F$, the "counter moment" generated by the weight W of the conveyor outer section 3 is greatest. In other words, as the conveyor outer section 3 moves in either direction D1 or D2 from one end position $C_D$ or $C_{F2}$ toward the intermediate position $C_I$, the moment generated by the weight W is increasingly reduced until the outer section 3 passes through the intermediate position $C_I$, and thereafter the weight W tends to facilitate movement toward the opposing end position $C_F$, $C_D$, respectively.

Still referring to FIGS. 7A and 7B, the actuator(s) 14 are each configured to exert an actuator force $F_A$ on the drive link 16, which has a first magnitude $m_{A1}$ when the linkage 12 is disposed at the first limit position and a second, substantially greater magnitude $m_{A2}$ when the linkage 12 is disposed at the second limit position $L_2$. Further, the connector link 18 exerts a pivot force $F_P$ on the conveyor outer section 3 when the actuator 14 exerts the actuator force $F_A$ on the drive link 16. In other words, the force $F_A$ applied to the drive link 16 is transferred through the link joint 24 to the connector link second end 18b, generating a tensile force in the link 18 that is applied in a direction along the centerline 18c to the second conveyor attachment point 22, and thus the conveyor outer section 3. The actuator 14 or/and the linkage 12 is configured such that the pivot force $F_P$ has a first magnitude $m_{P1}$ and a first moment arm $a_{m1}$ about the joint axis 4a when the linkage 12 is disposed at the first limit position $L_1$. Alternatively, the pivot force $F_P$ has a second magnitude $m_{P2}$ and a second moment arm $a_{m2}$ about the joint axis 4a when the linkage 12 is disposed at the second limit position $L_2$. Thus, the product of the pivot force first magnitude $m_{P1}$ and the first moment arm $a_{m1}$ is generally equal to the product of the pivot force second magnitude $m_{P2}$ and the second moment arm $a_{m2}$; that is, $m_{P1} \times a_{m1} \approx m_{P2} \times a_{m2}$, such that the two moments M1, M2 are at least generally (if not substantially) equal as discussed above.

Still referring to FIGS. 3, 6 and 7, each actuator 14 preferably includes a cylinder 36 with an interior chamber 37 containing a working fluid and the actuator drive member includes a rod 38. The rod 38 is movably disposed at least partially within the cylinder chamber 37 so as to define rod side and cylinder side chamber sections 37a, 37b (see FIG. 3B). The rod 38 is located or disposed at a generally extended position $R_E$ with respect to cylinder 36 at the actuator drive member first position $A_1$ and alternatively, the rod 38 is disposed at a generally retracted position $R_R$ with respect to the cylinder 36 at the drive member second position $A_2$. With this structure, working fluid within the rod chamber section 37a displaces the rod 38 when the actuator 14 displaces the drive link 16 from the drive link first position $p_{D1}$ toward the drive link second position $p_{D2}$. Alternatively, working fluid in the cylinder side chamber section 37b displaces the rod 38 when the actuator 14 displaces the drive link 16 from the drive link second position $p_{D2}$ toward the drive link first position $p_{D1}$. Further, the actuator 14 is sized such that the magnitude $m_{A1}$ of the force $F_A$ exerted by the actuator member 30 on the link 16 when the rod 38 is in the retracted position $R_R$ is a fraction of the magnitude $m_{A2}$ of the force $F_A$ exerted by the member 30 on the drive link 16 when the rod 38 is in the extended position $R_E$. The fraction of the force $m_{A1}/m_{A2}$ has a value such that the first moment magnitude M1 is generally equal to a second moment magnitude M2, as discussed in detail above.

Referring now to FIGS. 3 and 4, each one of the conveyor inner and outer sections 2, 3 preferably further has upper and lower surfaces 2d, 2e and 3d, 3e extending generally between the two section ends 2a, 2b and 3a, 3b, respectively. The upper surfaces 2d, 3d of the two conveyor sections 2, 3 are generally coplanar when the conveyor outer section 3 is located at the deployed position $C_D$. Alternatively, the conveyor outer section 3 is generally disposed above the upper surface 2d of the conveyor inner section 2 when the outer section 3 is located at the folded position $C_F$. With this conveyor structure, the actuator(s) 14 and the linkage(s) 12 are preferably each arranged on the inner and outer conveyor sections 2, 3 such that each one of the actuator 12, the drive link 16 and the connector link 18 remains spaced generally above the lower surface 2e of the conveyor inner section 2 when the linkage 12 displaces between the first and second limit positions $L_1$, $L_2$. More specifically, the actuator 14 preferably remains disposed generally between the upper and lower surfaces 2d, 2e of the conveyor inner section 2, or extends slightly above the upper surface 2d, at all positions of the linkage 12. The drive link 16 is disposed between the upper and lower surfaces 2d, 3d, 2e, 3e of each conveyor section 2, 3 in the first position $P_{D1}$ and extends across the inner ends 2a, 3a of the two conveyor sections 2, 3, and is disposed generally between the lower surfaces 2e, 3e and extends generally across the inner ends 2a, 3a of the two conveyor sections 2, 3 at the link second position $p_{D2}$. Further, the connector link 18 remains disposed generally between the upper and lower surfaces 3d, 3e of the conveyor outer section 3 at all positions of the connector link 18 and the linkage 12. As such, the linkage 12 and actuator 14 are contained within the sides of the conveyor sections 2, 3, and thus do not extend outwardly thereof, and are thereby arranged to prevent damage to any portion of the folding mechanism 10 (e.g., through contact with another vehicle, etc.).

Having described the basic components and functions above, these and other elements of the folding mechanism 10 and the preferred conveyor 1 incorporating the same are described in further detail below.

Figure 2:
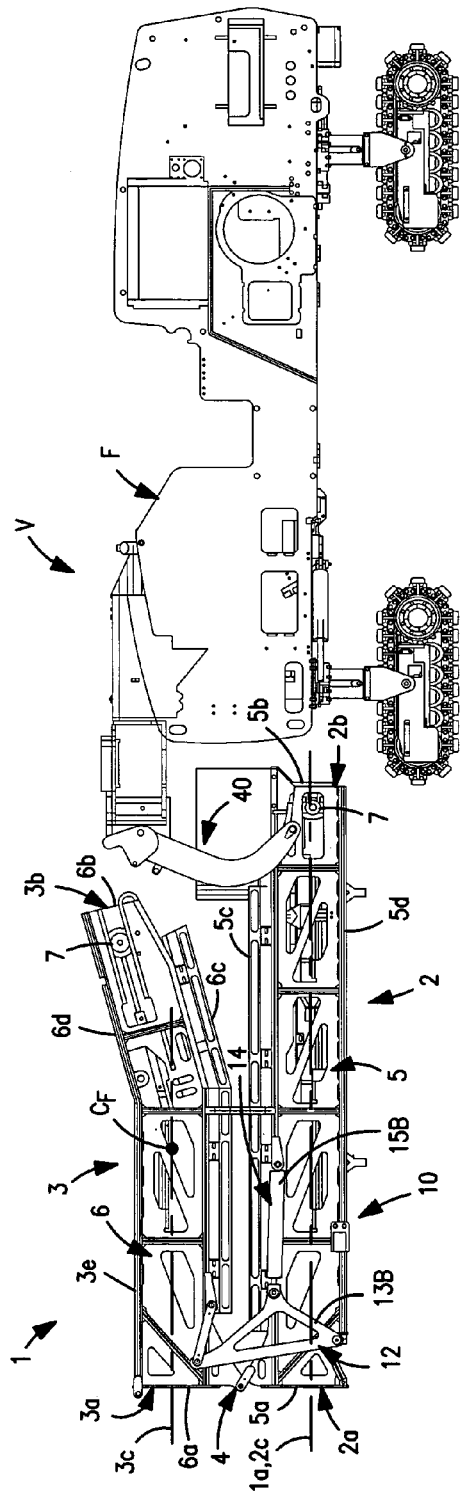
FIG. 2 is another view of the conveyor of FIG. 1, shown in a folded position.
Figure 5:
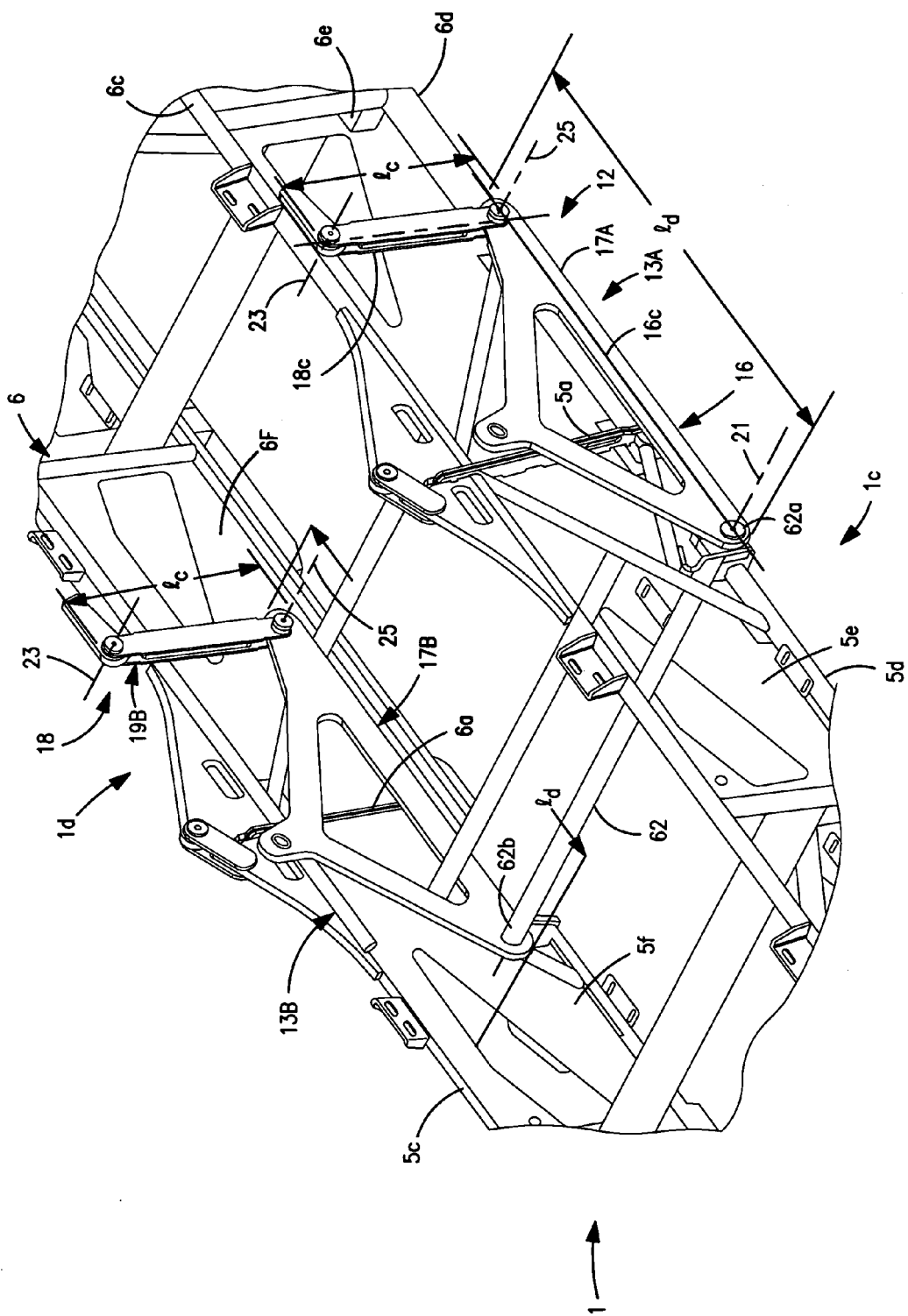
FIG. 5 is an enlarged, broken-away perspective view of the conveyor and folding mechanism, showing two folding linkages with the conveyor outer section in the deployed position.

Referring now to FIGS. 1, 2 and 5, the conveyor 1 is preferably a vehicle conveyor used with a road construction vehicle V, which is most preferably a milling machine with a mainframe F. However, the conveyor 1 may be used with any other type of vehicle V, and the folding mechanism 10 may even be used in non-vehicle applications. Preferably, the conveyor inner section 2 is movably coupled with the vehicle frame F by a yoke assembly 40 that permits the inner section 2, and thus the entire conveyor 1, to both pivotally elevate (i.e., up-down) and traverse (i.e., side-to-side) with respect to the mainframe F. However, the conveyor inner section 2 may be directly pivotally or fixedly connected with the vehicle mainframe F and/or fixedly or pivotally connected by any other appropriate means.

Further, each one of the first and second conveyor sections 2, 3 preferably includes a frame 5, 6, respectively, configured to support at least one drive roller or pulley 7 and the conveyor 1 preferably further includes a single endless belt (not shown) extending generally about the rollers 7 of both of the two conveyor section frames 5, 6. More specifically, each frame 5, 6 is preferably a generally rectangular and has opposing inner and outer ends 5a, 5b and 6a, 6b, respectively, and upper and lower ends 5c, 5d and 6c, 6d, respectively, and opposing left and right lateral sides 5e, 5f and 6e, 6f, respectively. The two frame inner ends 5a, 6a are pivotally connected by the joint 4 and each pulley 7 is located generally proximal to a separate one of the frame outer ends 5b, 6b. Further, each conveyor section 2, 3 preferably includes a plurality of axially spaced apart support rollers (none shown) connected with each frame 5, 6 so as to generally disposed between the two pulleys 7 and configured to support the conveyor belt. Furthermore, the conveyor 1 also preferably includes at least one motor (not shown) drivingly coupled with one of the pulleys 7, preferably the pulley 7 mounted to the conveyor outer section 3. The motor rotates the coupled pulley 7 to drive the belt to circulate about the conveyor frames 5, 6, such that the other pulley 7 basically functions as an idler.

Although the conveyor 1 is preferably constructed as generally discussed above, the folding mechanism 10 of the present invention may be used with any other appropriate conveyor structure. For example, the conveyor 1 may include two separate belts (not shown) each extending about a separate one of the two conveyor section frames 5, 6 or/and may be driven by a motor at the conveyor inner end or by two motors at each end. Further for example, the conveyor 1 may alternatively be constructed so as to fold generally downwardly, such that in the conveyor folded position $C_F$, the conveyor outer section 3 is disposed generally beneath the conveyor inner section 2. As yet another example, the conveyor 1 may be configured for use with another vehicle, such as a cargo ship, or may be used with a static structure, for example, a warehouse. The scope of the present invention is not limited by the particular structure or application of the conveyor 1, and the folding mechanism 10 may be used with a conveyor 1 of any appropriate construction.

Referring particularly to FIG. 5, as discussed above, the folding mechanism 10 preferably includes two linkages 12 each disposed on a separate lateral side 1c, 1d of the conveyor 1. Specifically, the folding mechanism 10 preferably includes first and second linkages 13A, 13B each including a drive link 17A, 17B and a connector link 19A, 19B, respectively. Specifically, the first drive link 13A is attached to the first lateral side 5e of the conveyor inner section frame 5 and the first connector link 19A is connected with the first lateral side 6e of the conveyor outer section frame 6 and with first drive link 19A. Similarly, the second drive link 13B is attached to the second lateral side 5f of the conveyor inner section frame 5 and the second connector link 19B is connected with the second lateral side 6f of the conveyor outer section frame 6 and with second drive link 19B. Further, the first and second drive links 17A, 17B each pivot about the drive link axis 21, which extends laterally through the conveyor inner section 2 and through the first end 16a of each one of the first and second drive links 17A, 17B, and the two drive links 17A, 17B each have a generally equal length ID between each link first and second ends 16a, 16b. In a similar manner, the first and second connector links 19A, 19B each pivot about the connector link axis 23, which extends laterally through the conveyor outer section 3 and through the second ends 18b of the two connector links 19A, 19B, the two connector links 19A, 19B each having a generally equal length $l_C$ between the link first and second ends 18a, 18b. Furthermore, the first and second linkages 13A, 13B are each configured such that the first and second drive links 17A, 17B each displace generally simultaneously about the drive link axis 21 and the first and second connector links 19A, 19B each displace generally simultaneously about the connector link axis 23. As such, the two linkages 13A, 13B generally move in a substantially identical manner between the two limit positions $L_1$, $L_2$, which prevents undesired torsional loading on the outer conveyor section 3 and/or the joint 4.

Referring to FIGS. 3, 5 and 6, the folding mechanism 10 preferably includes two actuators 14, specifically first and second actuators 15A, 15B, respectively, each operating a separate one of the preferred linkages 13A, 13B. Each of the first and second actuators 15A, 15B is mounted to a separate lateral side 5e, 5f of the inner conveyor section frame 5, is connected with a proximal one of the two drive links 17A, 17B, and is configured to displace the associated one of the first and second linkages 13A, 13B generally simultaneously between the first and second limit positions $L_1$, $L_2$ of each of the two linkages 13A, 13B. Preferably, each actuator 15A, 15B is mounted on the one side 5e, 5f of the inner conveyor section frame 5 by means of a bracket 42 connected with the actuator cylinder 36 so as to permit a slight pivotal displacement of the cylinder 36, and thus the actuator 14, within a vertical plane (not indicated), as discussed above. Most preferably, each actuator cylinder 36 is attached at a position at or at least proximal to, the upper end 5c of the conveyor section frame 5, and the actuator rod 38 is connected with the drive link 16 at a link attachment point 44 spaced from the drive link centerline 16c, and preferably generally above the centerline 16c (see, e.g., FIG. 7A). When the rod 38 moves along the actuator axis 14c, the link attachment point 44 is displaced generally along the actuator axis 14c as the drive link 16 angularly displaces between the drive link first position $p_{D1}$, at which the link centerline 16c is generally parallel with the actuator axis 14c, and the link second position $p_{D2}$, at which the link centerline 16c is generally perpendicular to the actuator axis 14c, and most preferably at an acute angle $A_D$ (see FIG. 7B) thereto, as described above.

Furthermore, each of the two actuators 15A, 15B preferably includes a hydraulic cylinder, but may alternatively include a pneumatic cylinder or any other appropriate type of actuator, such as for example, an electric or hydraulic motor (e.g., with a screw shaft and drive nut member). Additionally, the actuator(s) 14 may alternatively be mounted to the conveyor outer section 3 and/or may be configured to move the conveyor outer section 3 toward the deployed position $C_D$ when "retracting" and toward the folded position $C_F$ when "extending". Additionally, the folding mechanism 10 may include only a single actuator 14 directly attached or connected with one of the two preferred drive links 17A, 17B (or even with a single drive link 16). The scope of present invention encompasses these and all other alternative arrangements or structures of the actuator 14 that enables the folding mechanism to broadly function as described herein.

Referring now to FIGS. 5 and 6, each of the two preferred drive links 16 preferably includes a generally triangular body 50 having a main leg 52 and two side legs 54, 56. The link body main leg 52 extends generally along the drive link centerline 16c and provides the main load carrying and transferring capability of the drive link 16. Further, each of two side legs 54, 56 extend from generally proximal to a separate end 52a, 52b of the main leg 52 and converge or connect at a leg joint 58 that includes a tab 60 providing the link attachment point 44. Alternatively, each drive link 16 may include a T-shaped body (not shown) having a main leg extending generally along the drive link centerline and connective leg connected with the main leg at a position between the first and second ends so as to extend outwardly from the link centerline, the connective leg providing the link attachment point 44. As a further alternative, the drive link 16 may include a generally solid triangular shaped body or plate or may be formed in any other appropriate manner. Further, the folding mechanism 10 preferably further includes a drive link shaft 62 extending laterally through the frame 5 of the conveyor inner section 2 and having opposing ends 62a, 62b extending outwardly from a separate frame lateral side 5e, 5f, respectively. The drive link axis 21 extends longitudinally through the link shaft 62 and each of the first and second drive links 17A, 17B is mounted to a separate one of the shaft ends 62a, 62b, respectively.

Furthermore, the connector link 18 includes a pair of spaced apart, generally rectangular elongated plates 64 each having opposing ends 64a, 64b which provide the connector link first and second ends 18. Each connector link 18 is preferably pivotally attached to the conveyor outer section 3 by a pin shaft 66 extending through bracket 68 mounted to the conveyor outer section 3, preferably proximal to the frame upper end 6c, and through each plate end 64b. However, the connector link 18 may be constructed in any other appropriate manner, such as a single rectangular bar, etc., and or may be pivotally coupled with the conveyor outer section 3 and/or the drive link 16 by any other appropriate means.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

I claim:

1. A folding mechanism for a vehicle conveyor, the conveyor having a longitudinal axis generally along which the conveyor transports materials and including inner and outer sections and a joint pivotally connecting the inner and outer sections, each one of the conveyor inner and outer sections having first and second ends and a centerline extending between the two ends, the inner section being connectable with a vehicle and the inner section centerline being generally collinear with the conveyor axis, the outer section being pivotable about the joint between a deployed position at which the centerlines of the inner and outer conveyor sections are generally collinear and both centerlines extend generally along the conveyor axis and a folded position at which the conveyor outer section is disposed generally above the conveyor inner section, the folding mechanism comprising:
- a linkage configured to displace the conveyor outer section between the deployed and folded positions, the linkage including a drive link having a first end pivotably connected with the conveyor inner section, an opposing second end, and a centerline extending between the first and second ends, and a connector link having a first end pivotably connected with the drive link, a second end pivotably connected with the conveyor outer section, and a centerline extending between the connector link first and second ends, the linkage being moveable between a first limit position at which the conveyor outer section is located in the deployed position, the drive link centerline extends generally parallel to the conveyor axis and the connector link centerline extends generally perpendicular to the conveyor axis, and a second limit position at which the conveyor outer section is located in the folded position, the drive link centerline extends generally perpendicular to the conveyor axis, and the connector link centerline extends generally parallel to and is spaced above the conveyor axis.

2. The folding mechanism as recited in claim 1 further comprising an actuator mounted to the conveyor inner section and configured to displace the linkage between the first and second limit positions.

3. The folding mechanism as recited in claim 2 wherein the actuator has a central axis and a moveable drive member linearly displaceable generally along the axis, the actuator axis extending generally parallel with the conveyor axis, the actuator drive member being connected with the drive link such that displacement of the drive member along the axis moves the linkage between the first and second limit positions.

4. The folding mechanism as recited in claim 3 wherein the moveable drive member is displaceable along the actuator axis between a first position, at which the linkage is at the first limit position and a second position, at which the linkage is at the second limit position, the actuator being configured such that the actuator axis remains substantially parallel with the conveyor axis when the drive member displaces between the first and second positions.

5. The folding mechanism as recited in claim 4 wherein at least one of the actuator and the linkage is configured such that the folding mechanism exerts on the conveyor outer section a first moment about the joint axis when the actuator member displaces from the actuator first position toward the member second position and alternatively exerts on the conveyor outer section a second moment about the joint axis when the actuator member displaces from the actuator second position toward the first position, a magnitude of the first moment being generally equal to a magnitude of the second moment.

6. The folding mechanism as recited in claim 5 wherein:
the actuator is configured to exert an actuator force on the drive link, the actuator force having a first magnitude when the linkage is disposed at the first limit position and a second magnitude when the linkage is disposed at the second limit position, the second magnitude being substantially greater than the first magnitude;
the connector link exerts a pivot force on the conveyor outer section when the actuator exerts the actuator force on the drive link; and
at least one of the actuator and the linkage is configured such that the pivot force has a first magnitude and a first moment arm about the joint axis when the linkage is disposed at the first limit position and the pivot force has a second magnitude and a second moment arm about the joint axis when the linkage is disposed at the second limit position, the product of the pivot force first magnitude and the first moment arm being generally equal to the product of the pivot force second magnitude and the second moment arm.

7. The folding mechanism as recited in claim 2 wherein:
the drive link is angularly displaceable about an axis extending through the drive link first end between a first position at which the linkage is disposed in the first limit position and a second position at which the linkage is disposed in the second limit position; and
the actuator drive member is displaceable along the actuator axis between a first position at which the drive link is disposed in the drive link first position and a second position at which the drive link is located at the drive link second position, at least one of the actuator and the linkage being configured such that the actuator generates a first moment about the joint axis when the actuator member displaces from the actuator first position toward the actuator second position and alternatively generates a second moment about the joint axis when the actuator member displaces from the actuator second position toward the actuator first position, a magnitude of the first moment being generally equal to a magnitude of the second moment.

8. The folding mechanism as recited in claim 7 wherein:
the actuator includes a cylinder with an interior chamber containing a working fluid and the actuator drive member includes a rod movably disposed at least partially within the cylinder chamber so as to define rod side and cylinder side chamber sections;
the rod is disposed at a generally extended position with respect to cylinder at the actuator drive member first position and the rod is disposed at a generally retracted position with respect to the cylinder at the drive member second position; and
working fluid within the rod chamber section displaces the rod when the actuator displaces the drive link from the drive link first position toward the drive link second position and working fluid in the rod chamber second section displaces the rod when the actuator displaces the drive link from the drive link first position toward the drive link second position, the actuator being sized such that the force exerted by the actuator on the link when the rod is in the retracted position is a fraction of the force exerted by the actuator on the drive link when the rod is in the extended position, the fraction of the force having a value so that the first moment magnitude is generally equal to a second moment magnitude.

9. The folding mechanism as recited in claim 1 wherein:
each one of the conveyor inner and outer sections further has upper and lower surfaces extending generally between the two section ends, the upper surfaces of the two conveyor sections being generally coplanar when the conveyor outer section is located at the deployed position and the conveyor outer section is generally disposed above the upper surface of the conveyor inner section when the outer section is located at the folded position; and
the actuator and the linkage are arranged on the inner and outer conveyor sections such that each one of the actuator, the drive link and the connector link remains spaced generally above the lower surface of the conveyor inner section when the linkage displaces between the first and second limit positions.

10. The folding mechanism as recited in claim 9 wherein when the linkage displaces between the first and second limit positions:
   the drive link moves between a first position, at which the drive link is disposed between the upper and lower surfaces of each conveyor section and extends across the first, inner ends of the two conveyor sections, and a second position at which the drive link is disposed generally between the lower surfaces of the inner and outer conveyor sections and extends generally across the inner surfaces of the two conveyor sections; and
   the connector link remains disposed generally between the upper and lower surfaces of the conveyor outer section.

11. The folding mechanism as recited in claim 1 wherein the linkage is configured such that the drive link centerline extends substantially parallel to the conveyor axis and the connector link centerline extends substantially perpendicular to the conveyor axis when the linkage is disposed in the first limit position.

12. The folding mechanism as recited in claim 1 wherein the linkage is configured such that:
   the drive link centerline extends generally parallel to the conveyor inner section centerline and the connector link centerline extends generally perpendicular to the conveyor outer section centerline when the linkage is disposed at the first limit position; and
   the drive link centerline extends generally perpendicular to the conveyor inner section centerline and the connector link centerline extends generally parallel to the conveyor outer section centerline when the linkage is disposed at the second limit position.

13. The folding mechanism as recited in claim 12 wherein the linkage is configured such that when the linkage is disposed in the second limit position, a drive link angle defined between the drive link centerline and the conveyor inner section centerline has a value of greater than ninety degrees, and a connector link angle defined between the connector link centerline and the conveyor outer section centerline has a value of less than about fifteen degrees.

14. The folding mechanism as recited in claim 1 wherein:
   the conveyor outer section is disposeable at an intermediate position located between the deployed and folded positions, the conveyor outer section centerline being generally perpendicular to the conveyor inner section centerline at the intermediate position; and
   the linkage is further configured such that:
      when the linkage displaces the conveyor outer section from the deployed position to the intermediate position, the drive link displaces in a first angular direction about the drive link first end through a drive link first angle and the connector link displaces in a second, opposing angular direction about the connector link second end through a connector link first angle; and
      when the linkage displaces the conveyor outer section from the intermediate position to the folded position, the drive link displaces in the first direction about the drive link first end through a drive link second angle and the connector link displaces in the first direction about the connector link second end through a connector link second angle, the drive link first angle being at least two times greater than the drive link second angle and the connector link first angle being at least nine times greater than the connector link second angle.

15. The folding mechanism as recited in claim 14 wherein the drive link first angle is about sixty degrees, the drive link second angle is about twenty degrees, the connector first angle is about ninety degrees, and the connector link second angle is about twelve degrees.

16. The conveyor folding mechanism as recited in claim 1 wherein the drive link is connected with the conveyor inner section at drive link attachment point, the connector link is attached to the outer conveyor section at a connector link attachment point, and the linkage is a four bar mechanism further including a base link provided by a portion of the inner conveyor section extending between the drive link attachment point and the joint and a follower link provided by a section of the outer conveyor section extending between the connector link attachment point and the joint.

17. The folding mechanism as recited in claim 1 wherein each one of the conveyor inner and outer sections has upper and lower surfaces, the joint connects an inner end of each one of the inner and outer conveyor sections, and when the folding linkage displaces between the first and second linkage configurations:
   the drive link displaces between a first position located generally between the upper and lower surfaces of the two conveyor sections and extending across the two conveyor section inner ends, and a second position at which the drive link extends across the upper surfaces of two conveyor sections and is disposed between the two conveyor section lower surfaces and between the two ends of both of the two conveyor sections; and
   the connector link displaces between a first position at which the connector link extends generally transversely between the conveyor outer section upper and lower surfaces and a second position at which the connector link extends generally parallel to the outer conveyor upper and lower surfaces, the connector link remaining disposed generally between the first and second ends of the conveyor outer section as the linkage moves between the first and second linkage configurations.

18. The folding mechanism as recited in claim 1 further comprising an actuator mounted to the conveyor inner section and configured to displace the linkage between the first and second limit positions, the actuator having a central axis and a moveable drive member linearly displaceable generally along the axis, the drive member being connected with the drive link at an attachment point spaced from the drive link centerline such that the link attachment point is displaced generally along the actuator axis as the drive link angularly displaces between a first position at which the link centerline is generally parallel with the actuator axis and a second position at which the link centerline is generally perpendicular to the actuator axis.

19. The conveyor folding mechanism as recited in claim 18 wherein the drive link includes one of:
   a generally triangular body having a main leg extending generally along the drive link centerline and two legs extending from generally proximal to a separate end of the main leg and connecting at the actuator attachment point;
   a generally T-shaped body having a main leg, the main leg extending generally along the drive link centerline and providing the link first and second ends, and a connective leg having connected with the main leg at a position between the first and second ends and extending generally outwardly from the drive link centerline, the connective leg providing the actuator attachment point.

20. The conveyor folding mechanism as recited in claim 1 wherein when the linkage moves between the first and second limit positions, the conveyor outer section pivots about the joint through an angular displacement of about one hundred eighty degrees, the drive link pivots about the drive link first end through an angular displacement of about ninety degrees and the connector link pivots about the connector link second end through an angular displacement of about ninety degrees.

21. The conveyor folding mechanism as recited in claim 1 wherein:
   each one of the conveyor inner and outer sections has opposing first and second lateral sides;
   the drive link is a first drive link and is attached to a first lateral side of the conveyor inner section and the connector link is a first connector link and is connected with e a second lateral side of the conveyor outer section; and
   the folding mechanism further includes a second linkage configured to displace the conveyor outer section between the deployed and folded positions, the second linkage including a second drive link having a first end pivotably connected with the second lateral side of the conveyor inner section, an opposing second end, and a centerline extending between the first and second ends, and a second connector link having a first end pivotably connected with the drive link, a second end pivotably connected with the second lateral side of the conveyor outer section, and a centerline extending between the connector link first and second ends, the second linkage being moveable between a first limit position at which the conveyor outer section is located in the deployed position, the second drive link centerline extends generally parallel to the conveyor axis and the second connector link centerline extends generally perpendicular to the conveyor axis, and a second limit position at which the conveyor outer section is located in the folded position, the second drive link centerline extends generally perpendicular to the conveyor axis, and the second connector link centerline extends generally parallel to and is spaced above the conveyor axis.

22. The folding mechanism as recited in claim 21 wherein:
   the first and second drive links each pivot about a drive link axis extending laterally through the conveyor inner section and through the first end of each one of the first and second drive links, the two drive links each having a generally equal length between the link first and second ends;
   the first and second connector links each pivot about a connector link axis extending through the second ends of each one of the first and second connector links, the two connector drive links each having a generally equal length between the link first and second ends; and
   the first and second linkages are each configured such that the first and second drive links each displace generally simultaneously about the drive link axis and the first and second connector links each displace generally simultaneously about the connector link axis.

23. The folding mechanism as recited in claim 21 further comprising first and second actuators each mounted to the conveyor inner section, connected with a separate one of the two drive links, and configured to displace the connected one of the first and second linkages generally simultaneously between the first and second limit positions of each of the two linkages.

24. The folding mechanism as recited in claim 1 wherein each of the first and second conveyor sections includes a frame configured to support at least one roller and the conveyor further includes one of a single conveyor belt extending generally about the rollers of both of the two frames of the conveyor inner and outer sections and two conveyor belts each extending about the at least one roller of a separate one of the two frames of the conveyor inner and outer sections.

25. A folding mechanism for a vehicle conveyor, the conveyor including inner and outer sections and a joint pivotably connecting the inner and outer sections, each one of the conveyor inner and outer sections having first and second ends and a centerline extending between the two ends and the joint having an axis, the conveyor inner section being connectable with a vehicle and the conveyor outer section being pivotable about the joint axis between a deployed position at which the centerlines of the inner and outer conveyor sections are generally collinear and a folded position at which the conveyor outer section is disposed generally above the conveyor inner section, the folding mechanism comprising:
   a linkage configured to displace the conveyor outer section between the deployed and folded positions, the linkage including a drive link having a first end pivotably connected with the conveyor inner section and an opposing second end, and a connector link having a first end pivotably connected with the drive link and a second end pivotably connected with the conveyor outer section, the linkage being moveable between a first limit position at which the conveyor outer section is located in the deployed position and a second limit position at which the conveyor outer section is located in the folded position; and
   an actuator mounted on the conveyor inner section, configured to displace the linkage between the first and second limit positions, and having a movable member connected with the drive link, the movable member being displaceable between a first position at which the linkage is located at the first limit position and a second position at which the linkage is located at the second limit position, at least one of the actuator and the linkage being configured such that the folding mechanism exerts on the conveyor outer section a first moment about the joint axis when the actuator member displaces from the actuator first position toward the member second position and alternatively exerts on the conveyor outer section a second moment about the joint axis when the actuator member displaces from the actuator second position toward the first position, a magnitude of the first moment being generally equal to a magnitude of the second moment.

26. The folding mechanism as recited in claim 25 wherein:
   the actuator is configured to exert an actuator force on the drive link, the actuator force having a first magnitude when the linkage is disposed at the first limit position and a second magnitude when the linkage is disposed at the second limit position, the second magnitude being substantially greater than the first magnitude;
   the connector link exerts a pivot force on the conveyor outer section when the actuator exerts the actuator force on the drive link; and at least one of the actuator and the linkage is configured such that the pivot force has a first magnitude and a first moment arm about the joint axis when the linkage is disposed at the first limit position and the pivot force has a second magnitude and a second moment arm about the joint axis when the linkage is disposed at the second limit position, the product of the pivot force first magnitude and the first moment arm being generally equal to the product of the pivot force second magnitude and the second moment arm.

27. The folding mechanism as recited in claim 26 wherein the at least one of the actuator and the linkage are configured such that the pivot force second magnitude is substantially greater than the pivot force first magnitude and the first moment arm is substantially greater than the second moment arm.

28. The folding mechanism as recited in claim 26 wherein:
the actuator includes a cylinder with an interior chamber containing a working fluid and the actuator drive member includes a rod movably disposed at least partially within the cylinder chamber so as to define rod side and cylinder side chamber sections;
the rod is disposed at a generally extended position with respect to cylinder at the actuator drive member first position and the rod is disposed at a generally retracted position with respect to the cylinder at the drive member second position; and
working fluid within the rod side chamber section displaces the rod when the actuator displaces the linkage from the first limit position toward the second limit position and working fluid in the cylinder side chamber section displaces the rod when the actuator displaces the linkage from the second limit position toward the first limit position, such that the force exerted by the actuator on the linkage when the rod is in the extended position is a fraction of the force exerted by the actuator on the linkage when the rod is in the retracted position.

29. The folding mechanism as recited in claim 25 wherein:
the conveyor further has a longitudinal axis generally along which the conveyor transports materials, the centerlines of the inner and outer conveyor sections extending generally along the conveyor axis when the conveyor outer section is disposed at the deployed position;
each one of the drive and connector links has a centerline extending between the link first and second ends;
the drive link centerline extends generally parallel to the conveyor axis and the connector link centerline extends generally perpendicular to the conveyor axis when the linkage is disposed at the first limit position; and
the drive link centerline extends generally perpendicular to the conveyor axis, and the connector link centerline extends generally parallel to and is spaced above the conveyor axis at the second limit position.

30. The folding mechanism as recited in claim 29 wherein the linkage is configured such that when the linkage is disposed at the first limit position, the drive link centerline extends substantially parallel to the conveyor axis and the connector link centerline extends substantially perpendicular to the conveyor axis.

31. The folding mechanism as recited in claim 29 wherein the linkage is configured such that:
the drive link centerline extends generally parallel to the conveyor inner section centerline and the connector link centerline extends generally perpendicular to the conveyor outer section centerline when the linkage is disposed at the first limit position; and
the drive link centerline extends generally perpendicular to the conveyor inner section centerline and the connector link centerline extends generally parallel to the conveyor outer section centerline when the linkage is disposed at the second limit position.

32. The folding mechanism as recited in claim 29 wherein:
the conveyor outer section is disposeable at an intermediate position located between the deployed and folded positions, the conveyor outer section centerline being generally perpendicular to the conveyor inner section centerline at the intermediate position; and
the linkage is further configured such that:
when the linkage displaces the conveyor outer section from the deployed position to the intermediate position, the drive link displaces in a first angular direction about the drive link first end through a drive link first angle and the connector link displaces in a second, opposing angular direction about the connector link second end through a connector link first angle; and
when the linkage displaces the conveyor outer section from the intermediate position to the folded position, the drive link displaces in the first direction about the drive link first end through a drive link second angle and the connector link displaces in the first direction about the connector link second end through a connector link second angle, the drive link first angle being at least two times greater than the drive link second angle and the connector link first angle being at least nine times greater than the connector link second angle.

33. The folding mechanism as recited in claim 25 wherein:
each one of the conveyor inner and outer sections further has upper and lower surfaces extending generally between the two section ends, the upper surfaces of the two conveyor sections being generally coplanar when the conveyor outer section is located at the deployed position and the conveyor outer section is generally disposed above the upper surface of the conveyor inner section when the outer section is located at the folded position; and
the actuator and the linkage are arranged on the inner and outer conveyor sections such that each one of the actuator, the drive link and the connector link remains spaced generally above the lower surface of the conveyor inner section when the linkage displaces between the first and second limit positions.

34. A folding mechanism for a vehicle conveyor, the conveyor including inner and outer sections and a joint pivotally connecting the inner and outer sections, each one of the inner and outer conveyor sections having first and second ends, a centerline extending between the two ends, and upper and lower surfaces extending generally between the two ends, the conveyor inner section being connectable with a vehicle and the conveyor outer section being pivotable about the joint axis between a deployed position at which the upper surfaces of the two conveyor sections are generally coplanar and a folded position at which the conveyor outer section is disposed generally above the upper surface of the conveyor inner section, the folding mechanism comprising:
a linkage configured to displace the conveyor outer section between the deployed and folded positions, the linkage including a drive link having a first end pivotally connected with the conveyor inner section, an opposing second end, and a centerline extending between the first and second ends, and a connector link having a first end pivotally connected with the drive link, a second end pivotally connected with the conveyor outer section, and a centerline extending between the connector link first and second ends, the linkage being moveable between a first limit position at which the conveyor outer section is located in the deployed position and a second limit position at which the conveyor outer section is located in the folded position; and an actuator mounted on the conveyor inner section, operatively connected with the drive link, and configured to angularly displace the drive link about an axis extending through the drive link first end so as to move the linkage between the first and second limit positions, the actuator and folding linkage being arranged on the inner and outer conveyor sections such that each one of the actuator, the drive link and the connector link remains spaced generally above the lower surface of the conveyor inner section when the linkage moves between the first and second limit positions.

35. The folding mechanism as recited in claim 34 wherein when the linkage displaces between the first and second limit positions:

the drive link moves between a first position, at which the drive link is disposed between the upper and lower surfaces of each conveyor section and extends across the second ends of the two conveyor sections, and a second position at which the drive link is disposed generally between the lower surfaces of the inner and outer conveyor sections and extends generally across the inner ends of the two conveyor sections; and the connector link remains disposed generally between the upper and lower surfaces of the conveyor outer section.

36. A folding mechanism for a vehicle conveyor, the conveyor including an inner and outer sections and a joint pivotally connecting the inner and outer sections, each one of the conveyor inner and outer sections having first and second ends and a centerline extending between the two ends, the inner section being connectable with a vehicle and the inner section centerline being generally collinear with the conveyor axis, the outer section being pivotable about the joint between a deployed position at which the centerlines of the inner and outer conveyor sections are generally collinear and both centerlines extend generally along the conveyor axis and a folded position at which the conveyor outer section is disposed generally above the conveyor inner section, the folding mechanism comprising:

a linkage configured to displace the conveyor outer section between the deployed and folded positions, the linkage including a drive link having a first end pivotally connected with the conveyor inner section, an opposing second end, and a centerline extending between the first and second ends and a connector link having a first end connected with the drive link, a second end connected with the conveyor outer section, and a centerline extending between the first and second ends, the linkage being moveable between a first limit position at which the conveyor outer section is located in the deployed position and a second limit position at which the conveyor outer section is located in the folded position; and an actuator coupled with the conveyor inner section and having a moveable member linearly displaceable along an axis, the actuator axis extending generally parallel to the conveyor inner section centerline, the actuator member being coupled with the drive link such that displacement of the member along the axis moves the linkage between the first limit position, at which the drive link centerline extends generally parallel to and spaced below the actuator axis and the connector link centerline extends generally perpendicular to the actuator axis, and the second limit position, at which the drive link centerline extends generally perpendicular to the actuator axis and the connector link centerline extends generally parallel to and spaced above the actuator axis.

* * * * *